UNITED STATES PATENT OFFICE.

HEINRICH HEMPEL, OF BERLIN, GERMANY.

PROCESS OF PRODUCING CARBONACEOUS AGENTS FOR ENRICHING SPIRITS.

SPECIFICATION forming part of Letters Patent No. 621,338, dated March 21, 1899.

Application filed July 24, 1897. Serial No. 645,790. (No specimens.)

*To all whom it may concern:*

Be it known that I, HEINRICH HEMPEL, a subject of the King of Prussia, German Emperor, and a resident of Berlin, Germany, have invented a certain new and useful Improved Process of Producing a Carbonaceous Agent for Enriching Spirits, of which the following is a full, clear, and exact description.

The present invention consists of a process of producing a carbonaceous agent for enriching spirits and rendering the same capable of burning with a luminous flame.

In carrying out the present invention naphthalene is sulfonated so as to be soluble in water and then by a process of redistillation so much of the sulfur eliminated that after the mass has been added to a certain quantity of a suitable volatile oil, preferably turpentine-oil or benzol, ($C_6H_6$,) and this mixture added to ethyl alcohol the latter will burn with a luminous flame.

The process is carried out in the following manner: Five parts, by weight, of finely-powdered naphthalene are gradually added to six parts, by weight, of a ninety-six-per-cent. aqueous solution of sulfuric acid, the digestion occupying about a quarter of an hour and the mixture being continually stirred while the naphthalene is being added. The pulpy mass thus obtained is then heated up to about 160° centigrade and frequently agitated the while. This step of the process occupies about one hour, and the resulting mass is of a black-brown color. The mass is retained at the above-named temperature for about ten hours, during which period it is advantageously kept in a sealed receptacle in order to prevent volatilization, said receptacle having a nipple to receive a condenser-tube. The result is decanted off into a closed receptacle and when cold runs to a dark-brown pulpy mass. One part, by weight, of this sulfonated naphthalene is added to one part, by weight, of water, in which it entirely dissolves. The solution is now distilled at about 120° to 150° centigrade and deposits a compound containing sulfuric acid in the form of a black asphalt-like mass in the retort. The products of distillation—viz., water and sulfonated naphthalene—are then again distilled at a lower temperature—viz., about 100° centigrade—the result being that nearly all the water distils out of the mixture and very nearly all the sulfuric acid, leaving in the retort fluid naphthalene containing very little water and being only very slightly sulfonated. One part, by weight, of this product is mixed with from two to six parts, by weight, of turpentine-oil or benzol, the liquids being intimately mixed by shaking them together. The mixture is now ready for use and may be added to the alcohol in proportions varying from one part, by weight, of the solution to three to six parts, by weight, of the alcohol, according to the composition of the solution and the strength of the spirit. The compound thus obtained should be thoroughly shaken in order to intimately mix its constituent parts.

The above-described process for treating the naphthalene has the effect of eliminating sufficient sulfonic acid to allow the product to burn with a luminous flame when mixed with the oil and alcohol, while at the same time sufficient sulfonic acid remains in the compound to enable it to dissolve in the spirits and in water. Ordinary sulfonated naphthalene would not answer the purpose. It would crystallize out in the form of big crystals when the lamp burns and the sulfur contained in the same would prevent the flame from being luminous.

I claim as my invention—

A process for producing a carbonaceous agent for enriching alcohol which consists in mixing about five parts by weight of finely-powdered naphthalene with about six parts by weight of an aqueous solution of sulfuric acid, gradually heating the mixture to about 160° centigrade and retaining it at this temperature for about ten hours, allowing the mixture to cool, dissolving the result in water, distilling at 120° to 150° centigrade, redistilling the products of distillation at a lower temperature as specified, mixing the result with from two to six parts by weight of a volatile oil rich in carbon of the kind specified and adding the mixture to alcohol in the manner and for the purpose substantially as described.

In testimony whereof I have signed my name to this specification in the presence of two subscribing witnesses.

HEINRICH HEMPEL.

Witnesses:
W. HAUPT,
HENRY HASPER.